United States Patent Office 3,511,841
Patented May 12, 1970

3,511,841
1-[(4-, 5-, 6-, AND 7-AZAINDOLYL)-LOWER-ALKYL]-4-SUBSTITUTED-PIPERAZINES
Sydney Archer, Bethlehem, N.Y., assignor to Sterling Drug Inc., New York, N.Y., a corporation of Delaware
No Drawing. Continuation-in-part of application Ser. No. 481,075, Aug. 19, 1965, now Patent No. 3,362,956, dated Jan. 9, 1968, which is a continuation-in-part of application Ser. No. 254,475, Jan. 28, 1963. This application May 29, 1967, Ser. No. 642,166
Int. Cl. C07d 57/14
U.S. Cl. 260—268
20 Claims

ABSTRACT OF THE DISCLOSURE

New 1-[(4-, 5-, 6-, or 7-azaindolyl)-lower-alkyl]-4-substituted-piperazines indicated as being useful as tranquilizers, sedatives, skeletal muscle relaxants, adrenolytics, hypothermic agents, anti-convulsants, hypotensives, and cardiovascular agents.

This application is a continuation-in-part of my copending application Ser. No. 481,075, filed Aug. 19, 1965, now U.S. Pat. 3,362,956, patented Jan. 9, 1968, which in turn is a continuation-in-part of my prior application Ser. No. 254,475, filed Jan. 28, 1963, and now abandoned.

This invention relates to certain 1-[(azaindolyl)-lower-alkyl]-4-substituted-piperazines, their acid-addition and quaternary ammonium salts, and to intermediates and processes therefor.

The compounds of the invention are represented by the general formula:

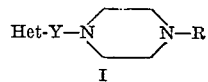

I wherein R is hydrogen, or a lower-alkyl, hydroxy-lower-alkyl, phenyl, phenyl-lower-alkyl, benzhydryl, phenyl-lower-alkenyl, cycloalkyl-lower-alkyl, or pyridyl radical; Y is lower-alkylene of from one to six carbon atoms; and Het is a 4-, 5-, 6-, or 7-azaindolyl radical, including the 1-(4-, 5-, 6-, or 7-azaindolyl), the 2-(4-, 5-, 6-, or 7-azaindolyl), and the 3-(4-, 5-, 6-, or 7-azaindolyl) isomers thereof.

In the above general Formula I, when R represents a lower-alkyl radical, it can be straight or branched and can contain from one to about six carbon atoms and thus stands, inter alia, for methyl, ethyl, isobutyl, n-hexyl, and the like.

When R represents an hydroxy-lower-alkyl radical, it can be straight or branched, can contain from two to six carbon atoms and is such that the oxygen atom of the hydroxy-lower-alkyl group and the nitrogen atom of the piperazine ring are separated by at least two carbon atoms. R thus also stands, inter alia, for 2-hydroxyethyl, 3-hydroxy-1-methylpropyl, 6-hydroxyhexyl, and the like.

When R represents cycloalkyl-lower-alkyl, the cycloalkyl moiety contains from three to seven ring carbon atoms, while the lower-alkyl moiety contains from one to four carbon atoms in the chain. R thus also stands for cyclopropylmethyl, cyclobutylmethyl, cyclopentylmethyl, cycloheptylmethyl, 2-cyclohexylethyl, and the like.

When R represents phenyl, phenyl-lower-alkyl, benzhydryl, or phenyl-lower-alkenyl, the benzene ring of said radicals can be unsubstituted or can bear one or more substituents of low molecular weight and of such nature that they do not interfere with or take part in the reactions, to be described hereinafter, used in the preparation of the compounds. Moreover, the nucleus of the group, Het, in any of the compounds of Formula I can also be further substituted in either of the rings thereof by one or more of such substituents. Examples of such substituents include halogen (including fluorine, chlorine, bromide, and iodine), lower-alkyl, hydroxy, lower-alkoxy, methylenedioxy, ethylenedioxy, lower - alkylmercapto, lower - alkylsulfinyl, lower-alkylsulfonyl, nitro, lower-alkanoyl, sulfamyl, trifluoromethyl, and the like. When R represents a phenyl-lower-alkyl radical, the lower-alkyl moiety of said radical can contain from one to four carbon atoms, and when R represents a phenyl-lower-alkenyl radical, the lower-alkenyl moiety of said radical can contain from three to four carbon atoms. Thus R represents inter alia, phenyl, benzyl, phenethyl, 4-phenylbutyl, benzhydryl, or cinnamyl or such radicals substituted in the benzene ring by one or more substitutents of the nature described above.

In the above general Formula I, the group Y represents lower-alkylene of from one to six carbon atoms, and can be straight or branched, and when the group Y is attached to a nitrogen atom of the heterocyclic group, Het, is such that at least two carbon atoms separate the nitrogen atoms of the heterocyclic group and the piperazine ring. The lower-alkylene group, Y, thus stands, inter alia, for methylene, 1,2-ethylene, 1,3-propylene, 2-methyl-1,4-butylene, 1,6-hexylene and the like.

The compounds of Formula I can also be substiuted in the piperazine ring by one or more lower-alkyl radicals each containing from one to four carbon atoms.

The compounds of the present invention can be prepared by one or more of the following reactions in which Het, R, and Y have the meanings given above, Hal represents a halogen atom, Alk represents a lower-alkyl radical, and Y' is a single bond or lower-alkylene containing from one to five carbon atoms.

Method A:

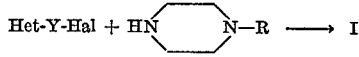

Method B:

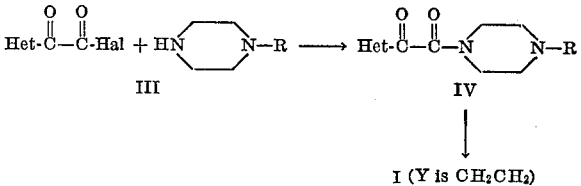

Method C:

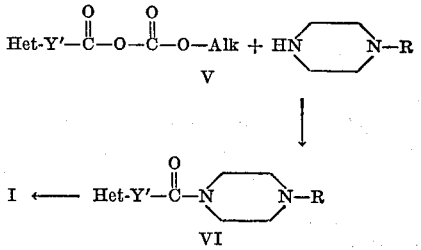

Method D:

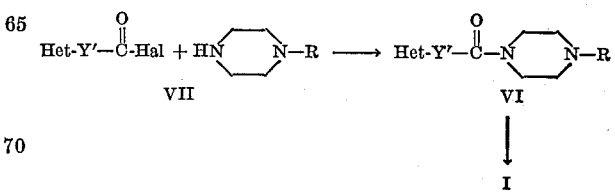

Method E:

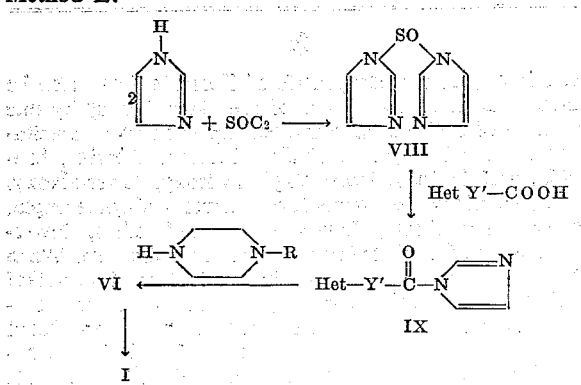

Method F:

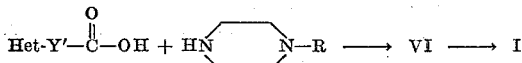

Method G:

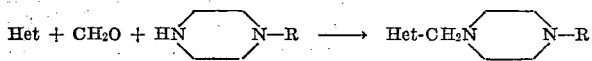

In Method A above, an (azaindolyl)-lower-alkyl halide is reacted with an appropriate 1-substituted-piperazine. The reaction is preferably carried out at a temperature between about 50° C. and 150° C. in the presence of an acid-acceptor in an organic solvent, inert under the conditions of the reaction, for example anhydrous ethanol, benzene, xylene, and the like. The purpose of the acid-acceptor is to take up the hydrogen halide which is split out during the course of the reaction. It is a basic substance which forms preferably water-soluble by-products easily separable from the main product of the reaction and includes such substances as alkali metal salts of weak acids, e.g. sodium carbonate, sodium bicarbonate, potassium carbonate, sodium acetate, sodium alkoxides, and the like. The acid-acceptor can also be in the form of an excess quantity of the 1-substituted-piperazine.

Method B above is used to prepare the compounds of Formula I where Y is a 1,2-ethylene group. The intermediate azaindolyl-glyoxalyl halides of Formula III required as intermediates in Method B are prepared by reacting a 4-, 5-, 6-, or 7-azaindole with a glyoxalyl halide preferably at a temperature in the range from about —20° C. to 25° C. in an organic solvent inert under the conditions of the reaction, for example ether, petroleum ether, dioxane, tetrahydrofuran, and the like, thus affording the azaindolyl-glyoxalyl halides of Formula III. The intermediates thus prepared are then reacted with a 1-substituted-piperazine to give the 1-[(azaindolyl)-glyoxalyl]-4-substituted-piperazines of Formula IV. The reaction is preferably carried out at a temperature between about —5° C. and about 65° C. in the presence of an acid-acceptor in an organic solvent inert under the conditions of the reaction, such as tetrahydrofuran, ether, ethylene dichloride, and the like. The purpose and nature of the acid-acceptor are the same as that described above in the description of Method A. The 1-[(azaindolyl)-glyoxalyl]-4-substituted-piperazines thus prepared are reacted with an alkali metal aluminum hydride preferably at a temperature between about 0° C. and about 65° C. in an organic solvent inert under the conditions of the reaction, for example ether or tetrahydrofuran. It is preferred to use lithium aluminum hydride in refluxing tetrahydrofuran.

In Method C above, an azaindolyl-lower-alkane mixed anhydride of Formula V is reacted with an appropriate 1-substituted-piperazine, preferably at a temperature between about —20° C. and about 20° C., to give the 1-[(azaindolyl)-lower-alkanoyl]-4-substituted-piperazines of Formula VI. The latter, on reaction with an alkali metal aluminum hydride as described above in the description of Method B, afford the compounds of Formula I. The intermediate mixed anhydrides of Formula V used as starting materials in Method C are prepared by reacting an (azaindolyl)-lower-alkanoic acid with a lower-alkyl haloformate. The reaction is preferably carried out in the presence of an acid-acceptor, for example triethylamine, at a temperature between about —20° C. and about 20° C. in an organic solvent inert under the conditions of the reaction such as anhydrous acetone, ether, ethylene dichloride, and the like. Acetone is a preferred solvent. The acid-acceptor, which takes up the hydrogen halide split out during the course of the reaction, is preferably a basic substance which forms water-soluble by-products easily separable from the product.

In Method D above, an (azaindolyl)-lower-alkanoyl halide of Formula VII is reacted with a 1-substituted-piperazine to give the 1-[(azaindolyl)-lower-alkanoyl]-4-substituted-piperazines of Formula VI. The reaction is preferably carried out at a temperature in the range from about —5° C. to 65° C. in the presence of an acid-acceptor in an organic solvent inert under the conditions of the reaction, such as tetrahydrofuran, ether, ethylene dichloride, and the like. The purpose and nature of the acid-acceptor are the same as that described above in the description of Method A. The 1-[(azaindolyl)-lower-alkanoyl]-4-substituted-piperazines of Formula VI thus prepared are then reduced with an alkali metal aluminum hydride as described above in the description of Method C.

The 1-[(azaindolyl)-lower-alkanoyl]-4-substituted-piperazines of Formula VI can also be prepared according to Methods E or F. In Method E, N,N'-thionyldiimidazole of Formula VIII is first prepared by reacting imidazole with thionyl chloride. The former is then reacted with an (azaindolyl)-lower-alkanoic acid, and the resulting N-(azaindolyl-lower alkanoyl)imidazole of Formula IX is reacted with a 1-substituted-piperazine to produce the 1 - [(azaindolyl) - lower - alkanoyl]-4-substituted-piperazines of Formula VI. If desired, the N,N'-thionyldiimidazole and the N-(azaindolyl-lower-alkanoyl)imidazole intermediates can be isolated prior to reaction in the next succeeding step, but it is advantageous to carry out the entire sequence of steps up to the formation of the 1 - [(azaindolyl) - lower-alkanoyl]-4-substituted-piperazines of Formula VI in essentially one operation, that is by reacting each intermediate, without isolation, with the next succeeding reactant using the same solvent medium for the entire sequence of reactions. Suitable solvents are organic solvents inert under the conditions of the reactions, for example tetrahydrofuran, diethyl ether, dibutyl ether, and the like. The reactions are preferably conducted at a temperature in the range from about —10° C. to about 50° C.

Alternatively the 1 - [(azaindolyl) - lower - alkanoyl]-4-substituted-piperazines of Formula VI can be prepared according to Method F. This method requires the direct interaction of an (azaindolyl) - lower - alkanoic acid with a 1-substituted-piperazine. The reaction is preferably conducted by direct fusion of the acid and the amine in the absence of any solvent and at a temperature sufficiently high to expel the water formed in the reaction. For this purpose, a temperature in the range from about 130° C. to 350° C. is suitable.

The 1 - [(azaindolyl) - lower - alkanoyl] - 4 - substituted - piperazines of Formula VI produced in each of Methods E and F are then reduced with an alkali metal aluminum hydride to the final products of Formula I as described above in the description of Method B.

Method G is used to prepare compounds of Formula I wherein Het is an aza-3-indolyl radical and the alkylene chain, Y, is methylene. The reaction is carried out by reacting an azaindole, i.e. a 4-, 5-, 6-, or 7-azaindole, with formaldehyde and an appropriate 1-substituted-piperazine preferably at a temperature between 50° C. and about 150° C. The formaldehyde can be in the form of an aqueous solution, i.e. 40% formalin solution, or a polymeric form of formaldehyde such as paraformaldehyde or trioxymethylene. When such polymeric forms are used, a molar excess of mineral acid, for example hydrochloric acid, is added to regenerate the free aldehyde from the polymer. The reaction is preferably carried out in an organic solvent inert under the conditions of the reaction, such as ethanol, methanol or 3-methylbutanol.

The novel compounds of the instant invention are the bases of Formula I and the acid-addition and quaternary ammonium salts of said bases, and said acid-addition and quaternary ammonium salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

The quaternary ammonium salts are obtained by the addition of esters of strong acids to the free base form of the compounds, said esters having a molecular weight less than about 200. A preferred class of esters comprises alkyl, alkenyl, and monocarbocyclic aryl - lower - alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, p-methoxybenzyl chloride, o-chlorobenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

It is also possible to convert one quaternary ammonium salt to another in which the anion is different. If the anion of the original quaternary salt forms a water-insoluble silver salt the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid can be prepared.

It will thus be appreciated that Formula I not only represents the structural configuration of the bases of my invention but is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition and quaternary ammonium salts of my new bases are useful and valuable compounds, regardless of considerations of solubility, toxicity, physical form, and the like.

The novel feature of the compounds of the invention, then, resides in the concept of the bases and cationic forms of the new 1-[(azaindolyl)-lower-alkyl]-4-substituted-piperazines and not in any particular acid or quaternary moiety or acid anion associated with the salt forms of my compounds; rather, the acid or quaternary moieties or anions which can be associated in the salt forms are in themselves neither novel nor critical and therefore can be any acid anion or acid-like substance capable of salt formation with bases. In fact in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid, organic mono- and polysulfonic and -sulfinic acids, organic phosphonic and phosphinic acids, organic acids of arsenic and antimony, organic heterocyclic carboxylic, sulfonic, and sulfinic acids, acidic ion-exchange resins, and inorganic acids of any acid forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid benzenesulfonic acid, p-toluenesulfonic acid, p-amino-phenylarsinic acid, phenylstibnic acid, phenylphosphinous acid, methylphosphonic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I has demonstrated that they possess a variety of depressant actions on the autonomic nervous system, the cardiovascular system, and the skeletal muscular system. They depress psychomotor activity as evidenced by studies in mice in standard activity cages; they possess sedative activity as shown by the potentiation of sleeping time in mice induced by ether, thiopental sodium or hexobarbital sodium. They show skeletal muscle relaxant activity in mice in the inclined screen test. When administered to rats, they show adrenolytic activity as evidenced by antagonism of the pressor effects of epinephrine; they lower the rectal temperature in mice; they possess anticonvulsant activity in mice as evidenced by their ability to protect mice from pentylenetetrazol-induced convulsions; they lower the blood pressure in rats; and they show cardiovascular activity in dogs as evidenced by the increase in heart force. These activities indicate their usefulness as tranquilizers, sedatives, skeletal muscle relaxants, adrenolytic agents, hypothermic agents, anticonvulsants, hypotensive agents and cardiovascular agents.

Psychomotor depressant activity data determined according to the method of Dews, Brit. J. Pharmacol. 8, 46–48 (1953), are given for representative compounds in Table 1 below where each of the compounds is identified by the number of the example which follows where its preparation is described, and the activities are generally or the effective dose in fifty percent of the animals tested As used hereinafter, the abbreviations i.p., p.o., and s.c. designate intraperitoneal, peroral, and subcutaneous administration, respectively, and unless noted otherwise, expressed in terms of an $ED_{50}$, i.e. the Effective Dose$_{50}$, dosages are in milligrams per kilograms (mg./kg.).

TABLE 1.—PSYCHOMOTOR DEPRESSANT ACTIVITY

| Example: | Activity |
|---|---|
| 1 | $ED_{50}=2.5\pm1.9$ (i.p.). |
|  | $ED_{50}=2.9\pm2.19$ (p.o.). |
| 2 | $ED_{50}=0.66\pm0.192$ (i.p.). |
|  | $ED_{50}=2.55\pm0.69$ (p.o.). |
| 3 | $ED_{50}=2.75\pm1$ (i.p.). |
|  | $ED_{50}=9.2\pm0.81$ (p.o.). |
| 4 | $ED_{50}=3.8\pm2.12$ (p.o.). |
| 5 | $ED_{50}=0.34\pm0.25$ (i.p.). |
|  | $ED_{50}=1.2\pm0.203$ (p.o.). |
| 6 | $ED_{50}=1.39\pm0.76$ (p.o.). |
| 7 | $ED_{50}=5.0\pm3.7$ (p.o.). |
| 13 | Active at 300 mg./kg. (p.o.). |

Sedative activity data for representative compounds as obtained in mice using the hexobarbital potentiation test described by Wylie, Proc. Soc. Exptl. Biol. Med. 98, 716–718 (1958) are given below in Table 2.

TABLE 2.—SEDATIVE ACTIVITY

| Example: | Activity |
|---|---|
| 1 | $ED_{50}=3.92\pm1.33$ (i.p.). |
|  | $ED_{50}=2.5\pm0.66$ (p.o.). |
| 2 | $ED_{50}=1.25\pm0.085$ (i.p.). |
|  | $ED_{50}=4.7\pm0.64$ (p.o.). |
| 3 | $ED_{50}=8.0\pm2.2$ (p.o.). |
|  | $ED_{50}=4.0\pm1.6$ (i.p.). |
| 4 | $ED_{50}=1.9\pm0.98$ (i.p.). |
|  | $ED_{50}=6.8\pm1.99$ (p.o.). |
| 5 | $ED_{50}=2.56\pm0.86$ (i.p.). |
|  | $ED_{50}=15.5\pm3.55$ (p.o.). |
| 6 | $ED_{50}=1.39\pm0.296$ (i.p.). |
|  | $ED_{50}=3.3\pm0.54$ (p.o.). |
| 7 | $ED_{50}=56.5\pm13.4$ (i.p.). |
|  | $ED_{50}=43.5\pm10.5$ (p.o.). |
| 8 | $ED_{50}=7.7\pm2.2$ (p.o.). |
| 12 | $ED_{50}=25.5\pm6.68$ (p.o.). |

Adrenolytic activity data for representative compounds as obtained by intravenous administration in rats using the procedure described by Luduena et al., Arch. int. Pharmacodyn. 122, 111–122 (1959) are given in Table 3 below. The dosages in each case are given in micrograms/kilogram.

TABLE 3.—ADRENOLYTIC ACTIVITY

| Example: | Activity |
|---|---|
| 1 | $ED_{50}=10$ mcg./kg. |
| 2 | $ED_{50}=11.8$ mcg./kg. |
| 3 | $ED_{50}=21.5$ mcg./kg. |
| 4 | $ED_{50}=10$ mcg./kg. |
| 5 | $ED_{50}=106$ mcg./kg. |
| 6 | $ED_{50}=80$ mcg./kg. |

Certain of the compounds of the invention have also been found to have hypothermic activity as evidenced by their ability to lower the rectal temperature in mice using the procedure described by Wylie, Proc. Soc. Exptl. Biol. Med. 98, 716–718 (1958). Representative compounds possessing such activity are given below in Table 4.

TABLE 4.—HYPOTHERMIC ACTIVITY

| Example | Dose (i.v.) (mg./kg.) | Decrease in temp. (° F.) |
|---|---|---|
| 1 | 1.0 | 2.8 |
| 4 | 1.0 | 1.5 |
| 6 | 1.25 | 4.9 |

Anti-convulsant activity data for representative compounds determined according to the method of Goodman, J. Pharm. Exptl. Therap. 108, 168 (1953), are given below in Table 5 where the activities are expressed either as an $ED_{50}$ or in terms of the percent animals protected from convulsions at a given dose level.

TABLE 5.—ANTI-CONVULSANT ACTIVITY

| Example: | Activity |
|---|---|
| 1 | 50% protected at 6.25 to 50 mg./kg. (i.p.). |
|  | 60% protected at 1.56 to 12.5 mg./kg. (p.o.). |
| 2 | 70% protected at 12.5 mg./kg. (i.p.). |
| 6 | $ED_{50}=1.85\pm0.26$ (i.p.). |

Hypotensive activity data for representative compounds determined according to the method of Kersten et al., J. Lab. Clin. Med. 32, 1090–1098 (1947), are given below in Table 6 where the activity is expressed in terms of the average effective dose (AED).

TABLE 6.—HYPOTENSIVE ACTIVITY

| Example. | Activity |
|---|---|
| 1 | AED=15 mg./kg. (p.o.). |
| 2 | AED=40 mg./kg. (p.o.). |
| 3 | AED= 6 mg./kg. (s.c.). |
| 6 | AED=20 mg./kg. (p.o.). |
|   | AED= 2 mg./kg. (s.c.). |
| 7 | AED=20 mg./kg. (s.c.). |
| 13 | AED=30 mg./kg. (s.c.). |

Certain of the compounds also show cardiovascular activity in dogs as evidenced by the ability of the compounds to increase the heart force as measured by a strain gauge. Thus at a cumulative dose of 1.85 mg./kg. (i.v.) administered at increments of 0.1 mg., 0.25 mg. 0.5 mg., and 1.0 mg., the compound 1-[2-(7-aza-3-indolyl)ethyl]-4-phenylpiperazine, prepared in Example 2 below, produced an increase in heart force of 82.9% while the blood pressure increased only 2.5% and the heart rate increased only 10.9%.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administrtion or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

EXAMPLE 1

1 - [2 - methyl - 7-aza-3-indolyl)ethyl]-4-phenylpiperazine [I: Het is 2-$CH_3$-7-aza-3-indolyl; Y is $CH_2CH_2$; R is $C_6H_5$].—To a solution of dimethylamine (0.35 mole), 80.5 ml. of acetic acid, 29.4 ml. (0.35 mole) of 37% formalin, and 58 ml. of water cooled to 20° C. was added 42.5 g. (0.23 mole) of 2-methyl-7-azaindole in portions over a period of thirty minutes while maintaining the temperature below 27° C. The reaction mixture was stirred at 20° C. for one hour and allowed to stand overnight, cooled to 5° C., and basified with 35% sodium hydroxide. The resulting yellow viscous oil which separated slowly solidified and was collected, dried, slurried with 500 ml. of boiling hexane and filtered giving 44 g. of 3-dimethylaminomethyl-2-methyl-7-azaindole.

Nine grams (0.04 mole) of the latter were suspended in 18.9 ml. (0.23 mole) of concentrated hydrochloric acid and treated with a solution of 11.2 g. (0.23 mole) of sodium cyanide in 1130 ml. of water. After addition of the sodium cyanide was complete, the reaction mixture was heated under reflux for six hours, cooled, and the pale yellow solid which had separated was collected and air dried giving 21 g. of crude material which was recrystallized from ethanol giving 11.1 g. of 3-cyanomethyl-2-methyl-7-azaindole, M.P. 206–208° C.

Nine grams (0.053 mole) of the latter were dissolved in 100 ml. of concentrated hydrochloric acid and the solution heated under reflux for twenty hours. The mixture was cooled and concentrated in vacuo to a small volume, and the tan solid which separated was collected and dissolved in 50 ml. of water, filtered, the pH adjusted to about 8.0 by addition of sodium hydroxide, filtered again, and acidified to pH 5.5 by addition of acetic acid. The mixture was cooled, and the solid which had separated was collected giving 8.1 g. of crude material which was recrystallized from tetrahydrofuran thus affording 7.7 g. of (2-methyl-7-aza-3-indolyl)acetic acid, M.P. 250.6–251.8° C. (corr.).

The product (5.1 g., 0.27 mole) was warmed with 2.7 g. (0.269 mole) of triethylamine and 50 cc. of acetone for about one hour, and the mixture was then diluted with 250 cc. of acetone, cooled to −50° C. and treated with 3.7 g. (0.0269 mole) of isobutyl chloroformate. The reaction mixture was maintained at −10° C. to −5° C. for forty-five minutes, then cooled to −15° C. and treated with a solution of 9.0 g. (0.055 mole) of 1-phenylpiperazine, stirred in an ice-bath for two hours, and filtered to remove the white solid which had separated. The solid was slurried with water, dried and recrystallized from ethanol giving a total yield from two crops of 4.7 g. of 1-[(2-methyl-7-aza-3-indolyl)acetyl]-4-phenylpiperazine, M.P. 187–189° C. (uncorr.).

The latter (5.2 g., 0.015 mole) was heated under reflux for about four hours in a mixture of 300 ml. of tetrahydrofuran and 3.4 g. (0.09 mole) of lithium aluminum hydride. The excess lithium aluminum hydride was decomposed by the careful addition of moist tetrahydrofuran and water. The mixture was then filtered and the filtrate taken to dryness. Recrystallization of the residual solid once from methanol and once from isopropanol afforded 3.5 g. of 1-[2-(2-methyl-7-aza-3-indolyl)ethyl]-4-phenylpiperazine, M.P. 197.8–199.2° C. (corr.).

1 - [2-(2-methyl-7-aza-3-indolyl)ethyl]-4-phenylpiperazine can be reacted with hydriodic acid to form 1-[2-(2-methyl-7-aza-3-indolyl)ethyl]-4-phenylpiperazine hydriodide, useful as a characterizing intermediate.

1 - [2-(2-methyl-7-aza-3-indolyl)ethyl]-4-phenylpiperazine, in the form of its hydriodide salt, can be converted to the hydrochloride salt by passing an aqueous solution of the former over an ion-exchange resin saturated with chloride ions.

1 - [2-(2-methyl-7-aza-3-indolyl)ethyl]-4-phenyl-piperazine can be converted to its hydriodide salt and the latter recrystallized for purification purposes from an appropriate organic solvent. On suspension of the hydriodide in dilute aqueous sodium hydroxide, extraction of the suspension with chloroform, and removal of the chloroform from the extracts, 1-[2-(2-methyl-7-aza-3-indolyl)ethyl]-4-phenylpiperazine can be recovered in purified free base form.

EXAMPLE 2

1-[2-(7-aza-3-indolyl)ethyl] - 4 - phenylpiperazine [I: Het is 7-aza-3-indolyl; Y is $CH_2CH_2$; R is $C_6H_5$].—One gram (0.006 mole) of (7-aza-3-indolyl)acetic acid was warmed in 6 ml. of thionyl chloride for thirty minutes and the excess thionyl chloride then removed in vacuo. The last traces of thionyl chloride were removed by boiling with chloroform and the residue was dissolved in tetrahydrofuran. To the solution was added 3 ml. of 1-phenylpiperazine and the mixture warmed slightly to dissolve all the solid. The reaction mixture was poured into an ice-water mixture, the resulting oil was extracted with methylene dichloride, the extracts dried over magnesium sulfate, and taken to dryness giving a crude solid which was recrystallized from ethyl acetate giving 0.2 g. of 1-[(7-aza-3-indolyl)acetyl] - 4 - phenylpiperazine, M.P. 174–177° C. (uncorr.).

The 1-[(7 - aza - 3 - indolyl)acetyl]-4-phenylpiperazine, (2.6 g., 0.008 mole) was reduced with 1.6 g. (0.042 mole) of lithium aluminum hydride in tetrahydrofuran using the manipulative procedure described above in Example 1. The crude product was recrystallized from methanol giving 1.3 g. of 1-[2-(7-aza-3-indolyl)ethyl]-4-phenylpiperazine, M.P. 197.1–199.5° C. (corr.).

EXAMPLE 3

1 - [3 - (2 - methyl - 7 - aza - 3 - indolyl)propyl]-4-(2-methoxyphenyl)-piperazine [I: Het is 2-$CH_3$-7-aza-3-indolyl; Y is $(CH_2)_3$; R is 2-$CH_3OC_6H_4$[.—A solution of 0.68 mole of dimethylamine in 154 ml. of 4 N acetic acid and 52.5 ml. (0.68 mole) of 37% aqueous formalin was cooled to 10° C. To the solution was added 82 g. (0.62 mole) of 2-methyl-7-azaindole in portions while maintaining the temperature between 10 and 15° C. The reaction mixture was stirred for several hours at 20° C., neutralized by addition of solid potassium carbonate, diluted with 150 ml. of water, and rendered strongly basic by the addition of 35% sodium hydroxide. The oil which separated solidified on standing and was collected, air dried, and extracted into boiling hexane. The hexane extracts, on cooling, yielded 73 g. of 3-dimethylaminomethyl-2-methyl-7-azaindole, M.P. 109–112° C.

The 3-dimethylaminomethyl-2-methyl - 7 - azaindole thus obtained (56.7 g., 0.3 mole) was dissolved in 150 ml. of tetrahydrofuran, and the solution diluted with 1500 ml. of anhydrous ether. To the solution was added 42.0 g. (0.3 mole) of methyl iodide, and the mixture was allowed to stand at room temperature overnight. The solid which separated was collected and air dried giving 97 g. of 3-dimethylaminomethyl-2-methyl-7-azaindole methiodide as a creamy white solid, M.P. 196–199° C. (uncorr.).

To solution of ethanolic sodium ethoxide, prepared by dissolving 6.9 g. (0.3 mole) of sodium in 750 ml. of absolute ethanol, was added 96 g. (0.6 mole) of diethyl malonate followed by 99.4 g. (0.3 mole) of 3-dimethylaminomethyl-2-methyl - 7 - azalindole methiodide. The reaction mixture was stirred overnight, filtered, and the filtrate poured into 6 liters of cold water. The solid which separated was collected and dried giving 77.5 g. of diethyl [(2-methyl-7-aza-3-indolyl)methyl]malonate, M.P. 105–108° C. The latter (40 g., 0.13 mole) was dissolved in 400 ml. of concentrated hydrochloric acid and the reaction mixture heated under reflux for six hours. The mixture was concentrated to dryness, the residue dissolved in 150 ml. of water, basified with aqueous 35% sodium hydroxide, filtered through filter aid, and the filtrate adjusted to pH 4.5 with acetic acid. The solid which separated was collected, air dried, and recrystallized from 20% aqueous acetone giving 5.7 g. of β - (2 - methyl-7-aza-3-indolyl)propionic acid, M.P. 220.6–222.2° C. (corr.).

The β-(2-methyl-7-aza-3-indolyl)propionic acid thus obtained (5.5 g., 0.027 mole) was reacted with 10.6 g. (0.06 mole) of 1-(2-methoxyphenyl)piperazine in thet presence of 2.7 g. (0.027 mole) of triethylamine and 3.7 g. (0.27 mole) of isobutyl chloroformate in acetone using the manipulative procedure described above in Example 1. The crude product was recrystallized from an acetate-hexane mixture giving 6 g. of 1-[β-(2-methyl-7-aza - 3 - indolyl)propionyl]-4-(2-methoxyphenyl)piperazine, M.P. 135–138° C. (uncorr.).

The 1-[β-(2-methyl-7-aza-3-indolyl)propionyl] - 4 - (2-methoxyphenyl)piperazine (5.3 g., 0.01 mole) was reduced with 3.2 g. (0.08 mole) of lithium aluminum hydride in tetrahydrofuran using the manipulative procedure described above in Example 1. The crude product was recrystallized from ethyl acetate giving 3.2 g. of 1-[3-(2-methyl-7-aza - 3 - indolyl)propyl]-4-(2-methoxyphenyl)piperazine, M.P. 132.6–135.0° C. (corr.).

EXAMPLE 4

1 - [3 - (7 - aza- 3 indolyl)propyl] - 4 - (2 - methoxyphenyl)piperazine [1: Het is 7-aza-3-indolyl; Y is $(CH_2)_3$; R is 2-$CH_3OC_6H_4$].—To a solution of 36 g. (0.3 mole) of 7-azaindole in 1 liter of n-butanol was added 26.4 g. (0.32 mole) of dimethyl-amine hydrochloride, 9.9 g. (0.33 mole) of paraformaldehyde, and 200 ml. of n-butanol. The reaction heated under reflux for thirty minutes, the solvent removed in vacuo, the residual solid dissolved in 300 ml. of water containing 30 ml. of concentrated hydrochloric acid, and the solution extracted with diethyl ether. The aqueous raffinate was basified to pH 12 by addition of solid potassium carbonate, and the solid which separated was collected and air dried giving 42.4 g. of 3-dimethylaminomethyl-7-azaindole, M.P. 152.6–154.0° C. (uncorr.).

Twenty grams (0.12 mole) of the latter and 55.2 g. of diethyl malonate (0.32 mole) were heated to 120° C. To the warm solution was added about 0.5 g. of sodium, and the reaction was heated and stirred to 120° C. for six hours. The reaction mixture was acidified by addition of 120 ml. of 6 N hydrochloric acid and extracted with ether. The aqueous raffinite was adjusted to pH 8 by the addition of solid sodium bicarbonate, and the light green precipitate that separated was collected and oven dried giving 30.8 g. of diethyl [(7-aza-3-indolyl)methyl]malonate.

The diethyl [(7-aza-3-indolyl)methyl]malonate (30.8 g., 0.11 mole) was refluxed with 60 ml. of concentrated hydrochloric acid for seven hours. The reaction mixture was taken to dryness in vacuo, the residue dissolved in water, and the solution neutralized with saturated aqueous sodium bicarbonate. The resulting solid was collected and oven dried giving 18.0 g. of β-(7-aza-3-indolyl)propionic acid.

Six grams of the β-(7-aza-3-indolyl)propionic acid thus obtained were reacted with 1-(2-methoxyphenyl)piperazine in the presence of triethylamine and isobutyl chloroformate in acetone using the manipulative procedure described above in Example 1. The product was crystallized from ethyl acetate giving 5.2 g. of 1-[β-(7-aza-3-indolyl)propionyl]-4 - (2 - methoxyphenyl)piperazine, M.P. 143.1–148.0° C.

The product (5.2 g., 0.043 mole) was reduced with lithium aluminum hydride (3.0 g., 0.08 mole) in tetrahydrofuran using the manipulative procedure described above in Example 1. The product was crystallized from ethyl acetate giving 2.4 g. of 1-[3-(7-aza-3-indolyl)-propyl] - 4 - (2 - methoxyphenyl)piperazine, M.P. 108.6–109.8° C. (corr.).

EXAMPLE 5

1 - [3 - (2 - methyl-7-aza-3-indolyl)propyl]-4-phenyl-piperazine [I: Het is 2-$CH_3$-7-aza-3-indolyl; Y is $(CH_2)_3$; R is $C_6H_5$] was prepared by reducing 5.5 g. (0.016 mole) of 1 - [β-(2-methyl-7-aza-3-indolyl)propionyl]-4-phenyl-piperazine [prepared from β-(2-methyl-7-aza-3-indolyl) propionic acid and 1-phenylpiperazine using the manipulative procedure described above in Example 1] with 3.2 g. (0.08 mole) of lithium aluminum hydride in tetrahydrofuran using the manipulative procedure described above in Example 1. The product was recrystallized from methanol giving 4.2 g. of 1-[3-(2-methyl-7-aza-3-indolyl) propyl]-4-phenylpiperazine, M.P. 150.8–151.8° C. (corr.).

EXAMPLE 6

1 - [3-(7-aza-3-indolyl)propyl]-4-phenylpiperazine [I: Het is 7-aza-3-indolyl; Y is $(CH_2)_3$; R is $C_6H_5$] was prepared by reducing 5.5 g. (0.017 mole) of 1-[β-(7-aza-3-indolyl)propionyl] - 4 - phenylpiperazine [prepared from β-(7-aza-3-indolyl)propionic acid and 1-phenylpiperazine using the manipulative procedure described above in Example 2] with 3.2 g. (0.084 mole) of lithium aluminum hydride in tetrahydrofuran using the manipulative procedure described above in Example 1. The product was recrystallized from ethyl acetate giving 4.6 g. of 1-[3-(7-aza - 3 - indolyl)propyl]-4-phenylpiperazine, M.P. 149.8–151.8° C. (corr.). The hydrochloride salt melted at 248–250° C. (uncorr.).

EXAMPLE 7

1 - [3 - (7-aza-3-indolyl)propyl]-4-(4-methoxyphenyl) piperazine [I: Het is 7-aza-3-indolyl; Y is $(CH_2)_3$; R is 4-$CH_3OC_6H_4$].—To a stirred solution of 14.3 g. (0.21 mole) of imidazole in 500 ml. of tetrahydrofuran under a nitrogen atmosphere was added 4.0 cc. (0.052 mole) of thionyl chloride while maintaining the temperature around 20° C. To the mixture containing N,N'-thionyldiimidazole was added 10.0 g. (0.052 mole) of β-(7-aza-3-indolyl)propionic acid, and the reaction mixture was stirred at room temperature for five hours. The mixture was then treated with a solution of 13.8 g. (0.052 mole) of 1-(4-methoxyphenyl)piperazine dihydrochloride in 20 ml. (0.143 mole) of triethylamine and stirred at room temperature for twelve hours. The solvent was removed under reduced pressure, the residue triturated with water, and the resulting solid collected and dried giving 14.3 g. of 1 - [β-(7-aza-3-indolyl)propionyl]-4-(4-methoxyphenyl) piperazine, M.P. 180–182° C. (uncorr.).

The latter (15.5 g., 0.042 mole) was reduced with lithium aluminum hydride in tetrahydrofuran using the manipulative procedure described above in Example 1. The crude product was recrystallized from acetone giving 11.5 g. of 1-[3-(7-aza-3-indolyl)propyl]-4-(4-methoxyphenyl)piperazine, M.P. 149.2–150.4° C. (corr.).

EXAMPLE 8

1 - [2 - (7 - aza-3-indolyl)ethyl]-4-(4-methoxyphenyl) piperazine [I: Het is 7-aza-3-indolyl; Y is $CH_2CH_2$; R is 4-$CH_3OC_6H_4$].—A mixture of 6.0 g. (0.034 mole) of (7-aza-3-indolyl)acetic acid and 7.1 g. (0.037 mole) of 1-(4-methoxyphenyl)piperazine was heated at 225° C. under nitrogen for thirty minutes. The cooled residue was dissolved in 50% aqueous ethanol and the solid which separated was collected and dried giving 10 g. of 1-[(7-aza - 3 - indolyl)acetyl]-4-(4-methoxyphenyl)piperazine, M.P. 150–155° C. (uncorr.). A small sample recrystallized from ethyl acetate gave M.P. 156–158° C. (uncorr.).

The crude product (10.0 g., 0.029 mole) was reduced with 6.5 g. (0.172 mole) of lithium aluminum hydride in 350 ml. of tetrahydrofuran using the manipulative procedure described above in Example 1. The crude product was recrystallized from methanol giving 7.6 g. of 1-[2-(7-aza - 3 - indolyl)ethyl] - 4-(4-methoxyphenyl)piperazine, M.P. 176.0–177.0° C. (corr.).

EXAMPLE 9

1 - [3 - (2-methyl-7-aza-3-indolyl)propyl]-4-(4-methylphenyl)piperazine [I: Het is 2-$CH_3$-7-aza-3-indolyl; Y is $(CH_2)_3$; R is 4-$CH_3C_6H_4$] was prepared by heating a mixture of 9.0 g. (0.049 mole) of β-(2-methyl-7-aza-3-indolyl)propionic acid and 8.6 g. (0.049 mole) of 1-(4-methylphenyl)piperazine for thirty minutes at 230–245° C. using the manipulative procedure described above in Example 8. There was thus obtained 14.3 g. of 1-[β-(2-methyl - 7 - aza-3-indolyl)propionyl]-4-(4-methylphenyl) piperazine, M.P. 151–155° C. (uncorr.). A small sample recrystallized from ethyl acetate gave material of M.P. 157–160° C. (uncorr.).

Reduction of the latter with 9.0 g. (0.237 mole) of lithium aluminum hydride in 500 ml. of tetrahydrofuran using the manipulative procedure described above in Example 1 and rescrystallization of the product from methnol afforded 9.6 g. of 1-[3-(2-methyl-7-aza-3-indolyl) propyl]-4-(4-methylphenyl)piperazine, M.P. 174.0–175.0° C. (corr.).

EXAMPLE 10

1-[2-(7-aza - 3 - indolyl)ethyl] - 4 - methylphenyl)piperazine [I: Het is 7-aza-3-indolyl; Y is $CH_2CH_2$; R is 4-$CH_3C_6H_4$] was prepared by heating a mixture of 7.9 g. (0.045 mole) of (7-aza-3-indolyl)acetic acid and 8.8 g. (0.049 mole) of 1-(4-methylphenyl)piperazine for thirty-five minutes at 230–245° C. using the manipulative procedure described above in Example 8. There was thus obtained 12.3 g. of 1-[(7-aza-3-indolyl)acetyl]-4-(4-methylphenyl)piperazine, M.P. 155–164° C. (uncorr.). A small sample recrystallized from ethyl acetate gave material of M.P. 156–159° C. (uncorr.).

Reduction of 11.6 g. (0.035 mole) of the latter with 7.6 g. (0.20 mole) of lithium aluminum hydride in 500 ml. of tetrahydrofuran using the manipulative procedure described above in Example 1 and recrystallization of the product from methanol afforded 8.5 g. of 1-[2-(7-aza-3-indolyl)ethyl] - 4-(4 - methylphenyl)piperazine, M.P. 189.6–190.0° C. (corr.).

EXAMPLE 11

1-[3-(2 - methyl - 7 - aza - 3 - indolyl)propyl] - 4-(4-methoxyphenyl)-piperazine [I: Het is 2 - $CH_3$-7-aza-3-indolyl; Y is $(CH_2)_3$; R is 4-$CH_3OC_6H_4$] was prepared by heating a mixture of 10.0 g. (0.049 mole) of β-(2-methyl-7-aza-3-indolyl)propionic acid and 10.3 g. (0.054 mole) of 1-(4-methoxyphenyl)piperazine for thirty minutes at 335° C. using the manipulative procedure described above in Example 8. There was thus obtained 17 g. of 1-[β-(2-methyl - 7 - aza - 3 - indolyl)propionyl]-4-(4-methoxyphenyl)piperazine, M.P. 187–192° C. (uncorr.). A small sample recrystallized from methanol gave material of M.P. 194–197° C. (corr.).

Reduction of 15.5 g. (0.041 mole) of the latter with 9.4 g. (0.25 mole) of lithium aluminum hydride in 500 ml. of tetrahydrofuran using the manipulative procedure described above in Example 1 and recrystallization of the product from methanol afforded 10.1 g. of 1 - [3 - (2-methyl - 7 - aza-3-indolyl)-propyl] - 4 - (4 - methoxyphenyl)piperazine, M.P. 161.8–163.2° C. (corr.).

EXAMPLE 12

1 - [3 - (2-methyl-7-aza-3-indolyl)propyl]-4-(4-chlorophenyl)piperazine [I: Het is 2-$CH_3$-7-aza - 3 - indolyl; Y is $(CH_2)_3$; R is 4-$ClC_6H_4$] was prepared by heating a mixture of 10.0 g. (0.049 mole) of β-(2-methyl-7-aza-3-indolyl)propionic acid and 10.8 g. (0.55 mole) of 1-(4-chlorophenyl)piperazine for twenty minutes at 230–240° C. using the manipulative procedure described above in Example 8. There was thus obtained 14.2 g. of 1-[β-(2-methyl - 7 - aza-3-indolyl)propyl]-4-(4-chlorophenyl) piperazine, M.P. 181–183.5° C. (uncorr.). A small sample recrystallized from methanol gave material of M.P. 184–185.5° C. (uncorr.).

Reduction of 13.0 g. (0.034 mole) of the latter with 6.5 g. (0.17 mole) of lithium aluminum hydride in 500 ml. of tetrahydrofuran using the manipulative procedure described above in Example 1 and recrystallization of the product from tetrahydrofuran afforded 8.9 g. of 1-[3-(2-methyl - 7 - aza-3-indolyl)propyl]-4-(4 - chlorophenyl) piperazine, M.P. 213.2–213.8° C. (corr.).

EXAMPLE 13

1 - [(2 - methyl-7-aza-3-indolyl)methyl] - 4-methylpiperazine [I: Het is 2-$CH_3$-7-aza-3-indolyl; Y is $CH_2$; R is $CH_3$].—A mixture of 6.6 g. (0.05 mole) of 2-methyl-7-aza-indole, 3.8 ml. of 37% formalin (0.05 mole), 5 g. (0.05 mole) of 1-methylpiperazine, and 70 ml. of glacial acetic acid was allowed to stand at room temperature for fifteen hours. The mixture was then poured into 500 ml. of water, and the mixture rendered alkaline by addition of excess potassium carbonate and extracted with chloroform. The extracts were dried over sodium sulfate and taken to dryness leaving a pale yellow crystalline solid which was recrystallized twice from ethyl acetate to give 3.1 g. of 1 - [(2-methyl-7-aza-3-indolyl)methyl]-4-methylpiperazine, M.P. 161.0–164.4° C. (corr.).

EXAMPLE 14

1 - [3-(7-aza-1-indolyl)propyl]-4-phenylpiperazine [I: Het is 7-aza-1-indolyl; Y is $(CH_2)_3$; R is $C_6H_5$].—To a solution of 3.0 g. (0.016 mole) of β-(7-aza-1-indolyl-propionic acid in acetone and a few milliliters of dimethylformamide was added 2.6 g. (0.016 mole) of 1-phenylpiperazine and dicyclohexylcarbodiimide. The solid which separated after standing for about five minutes was removed by filtration and the filtrate taken to dryness giving an orange oil which was redissolved in acetone, filtered, and the filtrate again taken to dryness. The residual oil was once again dissolved in acetone and the solution diluted with an ethereal solution of hydrochloric acid. Recrystallization of the precipitated solid from ethanol afforded 3.4 g. of 1-[β-(7-aza - 1 - indolyl)propionyl]-4-phenylpiperazine dihydrochloride, M.P. 182.6–183.6 C. (corr.).

The latter (7.3 g., 0.018 mole) was converted to the free base, and the base was dissolved in 70 ml. of tetrahydrofuran. This solution was then added dropwise with stirring to a suspension of 2 g. (0.053 mole) of lithium aluminum hydride in 30 ml. of tetrahydrofuran at 10° C. When addition was complete, the mixture was stirred at room temperature for about four hours and the excess lithium aluminum hydride destroyed by the addition of 5 ml. of water. Removal of the solid precipitate by filtration, evaporation of the filtrate to dryness, and recrystallization of the residue from hexane afforded 4.1 g. of 1 - [3-(7-aza - 3 - indolyl)acetyl]-4-(3-methoxyphenyl)piperazine, 75.8° C. (corr.).

EXAMPLE 15

1 - [2-(7-aza-3-indolyl)ethyl]-4-(3 - methoxyphenyl) piperazine [I: Het is 7 - aza-3-indolyl; Y is CH$_2$CH$_2$; R is 3-CH$_3$OC$_6$H$_4$].—A mixture of 18 g. (0.102 mole) of (7 - aza - 3 - indolyl)acetic acid and 21 g. (0.109 mole) of 1 - (3-methoxyphenyl)piperazine was heated under nitrogen at 230° C. for about one hour, cooled, and the melt recrystallized from isopropanol giving 31 g. of 1-[(7-aza-3-indolyl)acetyl]-4 - (3 - methoxyphenyl)piperazine, M.P. 120–123° C. (uncorr.).

The latter (18 g., 0.052 mole) was reduced with 11.7 g. (0.31 mole) of lithium aluminum hydride in 750 ml. of tetrahydrofuran and the product isolated in the manner described above in Example 1. Recrystallization of the product from methanol afforded 14.3 g. of 1-[2-(7-aza-3-indolyl)ethyl] - 4 - (3-methoxyphenyl)piperazine, M.P. 138.0–139.0° C. (corr.).

EXAMPLE 16

1 - [3 - (7-aza-3-indolyl)propyl]-4-(3-methoxyphenyl) piperazine [I: Het is 7-aza-3-indolyl; Y is (CH$_2$)$_3$; R is 3-CH$_3$OC$_6$H$_4$].—1 - [β - (7-aza-3-indolyl)propionyl]-4-(3-methoxyphenyl)piperazine was prepared by fusion of 18.5 g. (0.098 mole) of β - (7-aza-3-indolyl)propionic acid and 1 - (3-methoxyphenyl)piperazine under nitrogen at 225° C. using the procedure described in Example 15. Recrystallization of the product from aqueous methanol afforded 25.5 g. of the amide, M.P. 132.5–135° C.

The latter (24.5 g., 0.067 mole) was reduced with 15.5 g. (0.405 mole) of lithium aluminum hydride in one liter of tetrahydrofuran using the procedure described above in Example 1. Recrystallization of the product from ethyl acetate gave 20.5 g. of 1 - [3-(7-aza-3-indolyl)propyl]-4-(3 - methoxyphenyl)piperazine, M.P. 127.6–129.0° C. (corr.).

EXAMPLE 17

1 - [3 - (7-aza-3-indolyl)propyl]-4-(4-methylphenyl) piperazine [I: Het is 7 - aza-3-indolyl; Y is (CH$_2$)$_3$; R is 4-CH$_3$C$_6$H$_4$].—Fusion of 10 g. (0.053 mole) of β - (7-aza-3-indolyl)propionic acid and 10 g. (0.058 mole) of 1 - (4-methylphenyl)piperazine under nitrogen at 230° C. for one hour according to the procedure described above in Example 15 and recrystallization of the product from methanol afforded 10.6 g. of 1 - [β - (7-aza-3-indolyl)propionyl]-4-(4 - methylphenyl)piperazine, M.P. 161–163° C. (uncorr.).

Reduction of 10 g. (0.029 mole) of the latter with 6.5 g. (0.17 mole) of lithium aluminum hydride in 400 ml. of tetrahydrofuran using the procedure described above in Example 1 and recrystallization of the product from ethyl acetate afforded 8.7 g. of 1 - [3-(7-aza-3-indolyl)propyl]-4-(4 - methylphenyl)piperazine, M.P. 154.8–156.2° C. (corr.).

EXAMPLE 18

1 - [2 - (7 - aza-3-indolyl)ethyl]-4-(2-pyridyl)piperazine [I: Het is 7 - aza-3-indolyl; Y is CH$_2$CH$_2$; R is 2-C$_5$H$_4$N].—Fusion of 11.0 g. (0.063 mole) of (7-aza-3-indolyl)acetic acid and 11.2 g. (0.068 mole) of 1-(2-pyridyl)piperazine under nitrogen at 230° C. for forty-five minutes using the procedure described above in Example 15, and recrystallization of the product from ethanol afforded 17.4 g. of 1 - [β-(7-aza-3-indolyl)propionyl]-4-(2-pyridyl)piperazine, M.P. 195–198° C. (uncorr.).

Reduction of 18.9 g. (0.059 mole) of the latter with 13.5 g. (0.35 mole) of lithium aluminum hydride in 750 ml. of tetrahydrofuran using the procedure described above in Example 1, and recrystallization of the product from ethanol afforded 15.5 g. of 1 - [2 - (7-aza-3-indolyl) ethyl]-4-(2-pyridyl)piperazine, M.P. 153.0–155.2 C.

EXAMPLE 19

1 - [3-(7-aza-3-indolyl)propyl]-4-(2-pyridyl)piperazine [I: Het is 7-aza-3-indolyl; Y is (CH$_2$)$_3$; R is 2-C$_5$H$_4$N].—β-(7-aza-3-indolyl)propionic acid (9.5 g., 0.05 mole) was heated under nitrogen with 9.0 g. (0.055 mole) of 1-(2-pyridyl)piperazine in 10 ml. of dimethylformamide at 225–235° C. for thirty minutes. The solvent was removed from the hot mixture by blowing with a strong stream of nitrogen, and the product, which solidified on dilution of its solution in ethanol with sodium bicarbonate, was collected and recrystallized from methanol. There was thus obtained 6.5 g. of 1-[β-(7-aza-3-indolyl)propionyl]-4-(2-pyridyl)piperazine, M.P. 165–167° C. (uncorr.).

The latter (17.8 g., 0.053 mole) was reduced with 12.2 g. (0.32 mole) of lithium aluminum hydride in 700 ml. of tetrahydrofuran using the procedure described above in Example 1. Recrystallization of the product from methanol afforded 17.6 g. of 1-[3-(7-aza-3-indolyl)propyl]-4-(2-pyridyl)piperazine, M.P. 160–162.0° C. (corr.).

EXAMPLE 20

1-[3-(7-aza-3-indolyl)-2 - methylpropyl] - 4 - phenylpiperazine [I: Het is 7-aza-3-indolyl; Y is CH$_2$CHCH$_3$CH$_2$; R is C$_6$H$_5$].—Fusion of 13.5 g. (0.067 mole) of β-(7-aza-3-indolyl)-α-methylpropionic acid and 11.8 g. (0.073 mole) of 1-phenyl-piperazine under nitrogen at 235–240° C. for thirty minutes according to the procedure described above in Example 15, and recrystallization of the product from ethanol afforded 13.5 g. of 1-[β-(7-aza-3-indolyl)-α-methylpropionyl]-4-phenylpiperazine, M.P. 130–133° C. (uncorr.).

Reduction of 15 g. (0.043 mole) of the latter with 8.9 g. (0.23 mole) of lithium aluminum hydride in 500 ml. of tetrahydrofuran using the procedure described above in Example 1, and recrystalliaztion of the product from benzene afforded 11.5 g. of 1-[3-(7-aza-3-indolyl)-2-methylpropyl]-4-phenylpiperazine, M.P. 162.8–164.0° C. (corr.).

EXAMPLE 21

1-[3-(7-aza-3-indolyl)propyl]-4 - benzylpiperazine [I: Het is 7-aza-4-indolyl; Y is (CH$_2$)$_3$; R is C$_6$H$_5$CH$_2$].—Fusion of 30.5 g. (0.160 mole) of β-(7-aza-3-indolyl) propionic acid with 14 g. (0.08 mole) of 1-benzylpiperazine under nitrogen at 220–230° C. for one hour according to the procedure described in Example 15, and recrystalliaztion of the product from ethanol afforded 20.2 g. of 1-[3-(7-aza-3-indolyl)propyl]-4-benzylpiperazine, M.P. 120.0–122.0° C. (corr.).

Reduction of the latter with lithium aluminum hydride in tetrahydrofuran using the procedure described in Example 1 afforded 1-[3-(7-aza-3-indolyl)propyl]-4-benzylpiperazine.

EXAMPLES 22–24

By reacting 4-azaindole, 5-azaindole, or 2-methyl-6-azaindole with dimethylamine and formaldehyde, reacting the resulting 3-dimethylaminomethyl-azaindole with sodium cyanide, hydrolyzing the resulting 3-cyanomethylazaindole, reacting the the resulting (aza-3-indolyl)acetic acid with isobutyl chloroformate in acetone in the presence of triethylamine, reacting the resulting mixed anhydride with an appropriate 1-substituted-piperazine and reducing the resulting 1-[(aza-3-indolyl)acetyl]-4-substituted-piperazine with lithium aluminum hydride, all according to the manipulative procedure described above in Example 1, there can be obtained the respective compounds of Formula I in Table 7 below where Y, in each instance, is 1,2-ethylene.

TABLE 7

| Example | Het | R |
|---|---|---|
| 22 | 4-aza-3-indolyl | HOCH$_2$CH$_2$ |
| 23 | 5-aza-3-indolyl | 4-ClC$_6$H$_4$ |
| 24 | 2-CH$_3$-6-aza-3-indolyl | C-3H$_3$C$_6$H$_4$ |

EXAMPLE 25

1 - [6-(2-methyl-7-aza-3-indolyl)hexyl]-4-phenylpiperazine [I: Het is 2-CH$_3$-7-aza-3-indolyl; Y is (CH$_2$)$_6$; R is C$_6$H$_5$].—By reducing the β - (2-methyl-7-aza-3-indolyl) propionic acid obtained above in Example 3 with lithium aluminum hydride according to the manipulative procedure described above in Example 1, there can be obtained 3-(2-methyl-7-aza-3-indolyl)-propanol.

By reacting the latter with thionyl chloride in the presence of pyridine, there can be obtained 3-(2-methyl-7-aza-3-indolyl)propyl chloride.

By reacting the latter with sodium cyanide and hydrolyzing the resulting γ-(2-methyl-7-aza-3-indolyl)butyronitrile to the corresponding γ-(2-methyl-7-aza-3-indolyl) butyric acid, and reducing the latter with lithium aluminum hydride according to the manipulative procedure described above in Example 1, there can be obtained 4-(2-methyl-7-aza-3-indolyl)butanol.

By reacting the latter with thionyl chloride in the presence of pyridine, reacting the resulting 4-(2-methyl-7-aza-3-indolyl)butyl chloride with diethyl malonate in the presence of sodium ethoxide and saponifying the resulting malonate ester according to the manipulative procedure described above in Example 3, there can be obtained ω-(2-methyl-7-aza-3-indolyl)hexanoic acid.

By reacting the latter with isobutyl chloroformate in the presence of triethylamine, reacting the resulting mixed anhydride with 1-phenylpiperazine, and reducing the resulting 1 - [ω - (2 - methyl-7-aza-3-indolyl)hexanoyl]-4-phenylpiperazine with lithium aluminum hydride, all according to the manipulative procedure described above in Example 1, there can be obtained 1-[6-(2-methyl-7-aza-3-indolyl)hexyl]-4-phenylpiperazine.

EXAMPLES 26–36

By following the manipulative procedure described above in Example 3, substituting for the 1-(2-methoxyphenyl)-piperazine used therein a molar equivalent amount of an appropriate 1-substituted-piperazine, there can be obtained the compounds of Formula I in Table 8 below where, in each case, Het is 2-CH$_3$-7-aza-3-indolyl, and Y is (CH$_2$)$_3$.

TABLE 8

| Example | R | Piperazine substituent |
|---|---|---|
| 26 | 3,4-OCH$_2$OC$_6$H$_3$ | 3-CH$_3$ |
| 27 | 3,4-OCH$_2$CH$_2$OC$_6$H$_3$ | 6-CH$_3$ |
| 28 | 4-CH$_3$SC$_6$H$_4$ | 2-n-C$_4$H$_9$ |
| 29 | 4-CH$_3$SOC$_6$H$_4$ | 3-CH(CH$_3$)$_2$ |
| 30 | 4-CH$_3$SO$_2$C$_6$H$_4$ | 2,2-di-CH$_3$ |
| 31 | 4-CF$_3$C$_6$H$_4$ | 2,5-di-CH$_3$ |
| 32 | C$_6$H$_5$CH$_2$ | 2,6-di-CH$_3$ |
| 33 | C$_6$H$_5$CH=CHCH$_2$ | 3,6-di-CH$_3$ |
| 34 | (C$_6$H$_5$)$_2$CH | 2,5-di-n-C$_3$H$_7$ |
| 35 | C$_3$H$_5$CH$_2$ | 3-CH$_3$ |
| 36 | C$_6$H$_{11}$CH$_2$ | 6-CH$_3$ |

EXAMPLE 37

1 - [3 - (2 - methyl - 7 - aza - 3 - indolyl)propyl]-2,6-dimethylpiperazine [I: Het is 2-CH$_3$-7-aza-3-indolyl; Y is (CH$_2$)$_3$; R is H].—By reducing the 1-[3-(2-methyl-7-aza-3 - indolyl) - propyl] -4 - benzyl - 2,6 - dimethylpiperazine described above in Example 32 with hydrogen over a palladium-on-charcoal catalyst in an ethanol solvent, there can be obtained 1-[3-(2-methyl-7-aza-3-indolyl)propyl]-2,6-dimethylpiperazine.

EXAMPLE 38

1 - [2 - (7 - aza - 2 - indolyl)ethyl] - 4 - phenylpiperazine [I: Het is 7 - aza - 2 - indolyl; Y is (CH$_2$)$_2$; R is C$_6$H$_5$].—By reacting 2-methyl-7-azaindole with N-bromsuccinimide in chloroform, reacting the resulting 2-bromomethyl - 7 - azaindole with sodium cyanide in an ethanol solvent, and hydrolyzing the resulting 2-cyanomethylindole with concentrated hydrochloric acid using the manipulative procedure described above in Example 1, there is obtained (7 - aza - 2 - indolyl)acetic acid. Reaction of the latter with 1-phenylpiperazine, using the manipulative procedure described above in Example 8, gives 1 - [(7 - aza - 2 - indolyl)acetyl] - 4 - phenylpiperazine, which on reduction with lithium aluminum hydride, using the manipulative procedure described above in Example 1, affords 1-[2-(7-aza-2-indolyl)ethyl]-4-phenylpiperazine.

I claim:
1. A compound of the formula

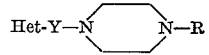

wherein Het is 4 - aza - 1-, 2-, and 3-indolyl, 5-aza-1-, 2-, and 3-indolyl, 6-aza-1-, 2-, and 3-indolyl, or 7-aza-1-, 2-, and 3-indolyl; R is a hydrogen atom or lower-alkyl, hydroxy-lower-alkyl, phenyl, phenyl-lower-alkyl, benzhydryl, phenyl-lower-alkenyl, cycloalkyl-lower-alkyl having from three to seven ring carbon atoms, or pyridyl; and Y is lower-alkylene of from one to six carbon atoms.

2. A compound according to claim 1 wherein Het is 7 - aza - 3 - indolyl, and R is phenyl.

3. A compound according to claim 1 wherein Het is 7 - aza - 3 - indolyl, and R is lower-alkyl.

4. A compound according to claim 1 wherein Het is 7 - aza - 3 - indolyl, and R is pyridyl.

5. 1 - [3 - (7 - aza - 3 - indolyl)propyl] - 4 - phenylpiperazine according to claim 2 wherein Het is 7-aza-3-indolyl, and Y is 1,3-propylene.

6. 1 - [2 - (7 - aza - 3 - indolyl)ethyl] - 4 - phenylpiperazine according to claim 2 wherein Het is 7 - aza - 3-indolyl, and Y is 1,2-ethylene.

7. 1 - [2 - (2 - methyl - 7 - aza - 3 - indolyl) - ethyl]-4-phenyl-piperazine according to claim 2 wherein Het is 2 - methyl - 7 - aza - 3 - indolyl, and Y is 1,2-ethylene.

8. 1 - [3 - (2 - methyl - 7 -aza - 3 - indolyl) - propyl]-4-phenylpiperazine according to claim 2 wherein Het is 2-methyl-7-aza-3-indolyl, and Y is 1,3-propylene.

9. 1 - [3 - (2 - methyl - 7 - aza - 3 - indolyl)propyl]-4 - (2 - methoxyphenyl)piperazine according to claim 2 wherein Het is 2 - methyl - 7 - aza - 3 - indolyl, Y is 1,3-propylene, and R is 2-methoxyphenyl.

10. 1 - [3 - (7 - aza-3-indolyl)propyl]-4-(2-methoxyphenyl)piperazine according to claim 2 wherein Het is 7-aza-3-indolyl, Y is 1,3-propylene, and R is 2-methoxyphenyl.

11. 1 - [2 - 7-aza-3-indolyl)ethyl]-4-(4-methylphenyl)-piperazine according to claim 2 wherein Het is 7-aza-3-indolyl, Y is 1,2-ethylene, and R is 4-methylphenyl.

12. 1 - [3 - (7 - aza-3-indolyl)propyl]-4-(3-methoxyphenyl)piperazine according to claim 2 wherein Het is 7-aza-3-indolyl, Y is 1,3-propylene, and R is 3-methoxyphenyl.

13. 1 - [3 - (7 - aza - 3 - indolyl)propyl]-4-(4-methylphenyl)piperazine according to claim 2 wherein Het is 7-aza-3-indolyl, Y is 1,3-propylene, and R is 4-methylphenyl.

14. 1 - [2 - (7 - aza - 3 - indolyl)ethyl]-4-(4-methoxyphenyl)piperazine according to claim 2 wherein Het is 7-aza-3-indolyl, Y is 1,2-ethylene, and R is 4-methoxyphenyl.

15. 1 - [(2 - methyl - 7 - aza - 3 - indolyl)methyl]-4-methylpiperazine according to claim 3 wherein Het is 2-methyl-7-aza-3-indolyl, Y is methylene, and R is methyl.

16. 1 - [3 - (7 - aza - 3 - indolyl)propyl]-4-(2-pyridyl)piperazine according to claim 4 wherein Het is 7-aza-3-indolyl, Y is 1,3-propylene, and R is 2-pyridyl.

17. 1 - [2 - (7 - aza - 3 - indolyl)ethyl]-4-(2-pyridyl)piperazine according to claim 4 wheren Het is 7-aza-3-indolyl, Y is 1,2-ethylene, and R is 2-pyridyl.

18. A compound having the formula

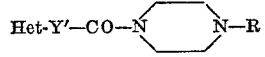

wherein Het is 4-aza-1-, 2-, and 3-indolyl, 5-aza-1-, 2-, and 3-indolyl, 6-aza-1-, 2-, and 3-indolyl, or 7-aza-1-, 2-, and 3-indolyl; R is a hydrogen atom or lower-alkyl, hydroxy-lower-alkyl, phenyl, phenyl-lower-alkyl, benzhydryl, phenyl-lower-alkenyl, cycloalkyl-lower-alkyl having from three to seven ring carbon atoms, or pyridyl; and Y' is a single bond or lower-alkylene having from one to five carbon atoms.

19. 1 - [β - (7 - aza - 1 - indolyl)propionyl]-4-phenylpiperazine according to claim 18 wherein Het is 7-aza-1-indolyl, and Y' is 1,2-ethylene.

20. 1 - [β - (7 - aza - 3 - indolyl)propionyl]-4-benzylpiperazine according to claim 18 wherein Het is 7-aza-3-indolyl, Y' is 1,2-ethylene, and R is benzyl.

References Cited
UNITED STATES PATENTS

| | | | |
|---|---|---|---|
| 2,927,924 | 3/1960 | Mills | 260—268 |
| 3,004,978 | 10/1961 | Hunger et al. | 260—268 X |
| 3,122,551 | 2/1964 | Zaugg et al. | 260—268 |
| 3,133,069 | 5/1964 | Ash et al. | 260—268 |
| 3,188,313 | 6/1965 | Archer | 260—268 |
| 3,318,880 | 5/1967 | Almirante et al. | 260—268 X |

DONALD G. DAUS, Primary Examiner

U.S. Cl. X.R.

260—240, 544, 295, 309, 260, 242; 424—250

FO-1050
(5/69)

UNITED STATES PATENT OFFICE
CERTIFICATE OF CORRECTION

Patent No. 3,511,841     Dated May 12, 1970

Inventor(s) Sydney Archer

It is certified that error appears in the above-identified patent and that said Letters Patent are hereby corrected as shown below:

Column 2, line 27, "substiuted" should read --substituted--.

Column 3, line 5, the reactant in Method E indicated as "$SOC_2$" should read --$SOCl_2$--.

Column 7, line 46, after "generally", insert --expressed in terms of $ED_{50}$, i.e. the Effective Dose$_{50}$--; line 47, insert a period after "tested"; line 51, delete "expressed in terms of an $ED_{50}$, i.e. the Effective Dose$_{50}$,".

Column 9, line 28, "administrtion" should read --administration--; line 45, "[2-Methyl" should read --[2-(2-Methyl--.

Column 11, line 28, "To solution" should read --To a solution--; line 33, "7-azalindole" should read --7-aza-1-indole--; line 51, "in thet" should read --in the--; line 55, "acetate-hexane" should read --ethyl acetate-hexane--.

Column 12, line 15, "raffinite" should read --raffinate--.

Column 13, line 59 "rescrystallization" should read --recrystallization--; line 65, "4-methylphenyl)" should read --4-(4-methylphenyl)--.

Column 15, line 3, "etheral" should read --ethereal--; lines 18-19, "(7-aza-3-indolyl)acetyl]-4-(3-methoxyphenyl)piperazine" should read --(7-aza-1-indolyl)propyl]-4-phenylpiperazine--; line 20, "75.8°C." should read --73.6-75.8°C.--.

Column 16, line 8, "recryallization" should read --recrystallization--; line 16, "155.2 C." should read --155.2°C.--; line 52, "recrystalliaztion" should read --recrystallization--; line 63, "recrystalliaztion" should read --recrystallization--.

UNITED STATES PATENT OFFICE
CERTIFICATE OF CORRECTION

Patent No. 3,511,841　　　　　　　　Dated May 12, 1970

PAGE - 2

Inventor(s) Sydney Archer

It is certified that error appears in the above-identified patent and that said Letters Patent are hereby corrected as shown below:

Column 17, line 1, delete "the", first occurrence; line 15, "C-$3H_3C_6H_4$" should read --3-$CH_3C_6H_4$--.

Claim 17, column 19, line 16, "wheren" should read --wherein--.

Signed and sealed this 15th day of February 1972.

(SEAL)
Attest:

EDWARD M. FLETCHER, JR.　　　　　ROBERT GOTTSCHALK
Attesting Officer　　　　　　　　　Commissioner of Patents